United States Patent
Turgeman

(10) Patent No.: US 11,736,478 B2
(45) Date of Patent: *Aug. 22, 2023

(54) DEVICE, SYSTEM, AND METHOD OF USER AUTHENTICATION BASED ON USER-SPECIFIC CHARACTERISTICS OF TASK PERFORMANCE

(71) Applicant: BioCatch Ltd., Tel Aviv (IL)

(72) Inventor: Avi Turgeman, New York, NY (US)

(73) Assignee: BIOCATCH LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,406

(22) Filed: Dec. 23, 2021

(65) Prior Publication Data

US 2022/0116389 A1 Apr. 14, 2022

Related U.S. Application Data

(63) Continuation of application No. 16/597,860, filed on Oct. 10, 2019, now Pat. No. 11,223,619, which is a
(Continued)

(51) Int. Cl.
*H04L 9/40* (2022.01)
*G06F 3/04883* (2022.01)
(Continued)

(52) U.S. Cl.
CPC .......... *H04L 63/0861* (2013.01); *G06F 3/017* (2013.01); *G06F 3/03543* (2013.01);
(Continued)

(58) Field of Classification Search
CPC ... H04L 63/0861; H04L 63/083; G06F 3/017; G06F 3/03543; G06F 3/03547; G06F 3/04845; G06F 3/04883
(Continued)

(56) References Cited

U.S. PATENT DOCUMENTS

| 5,442,342 A | * | 8/1995 | Kung | ............... H04L 9/3271 235/382 |
| 5,999,162 A | * | 12/1999 | Takahashi | ............ G09G 1/162 345/440.1 |

(Continued)

OTHER PUBLICATIONS

WO 2007068098 A1, PCT, Chiviendacz, Michael, Priority date Dec. 12, 2009.*

*Primary Examiner* — Dant B Shaifer Harriman
(74) *Attorney, Agent, or Firm* — Daniel J. Swirsky; AlphaPatent Associates Ltd.

(57) ABSTRACT

Devices, systems, and methods of detecting user identity, authenticating a user to a computerized service or to an electronic device, differentiating between users of a computerized service, and detecting possible attackers or possible fraudulent transactions. A method includes: generating a user authentication session that requires a user to enter a secret by performing a task; monitoring the user interactions during task performance; extracting a user-specific behavioral characteristic, and utilizing it as a factor in user authentication. The task requires the user to perform on-screen operations via a touch-screen or touchpad or mouse or other input unit of the electronic device, or to move in space or tilt in space the entirety of the electronic device in a way that causes inputting of the secret data-item.

16 Claims, 3 Drawing Sheets

Related U.S. Application Data continuation-in-part of application No. 15/051,700, filed on Feb. 24, 2016, now Pat. No. 10,476,873, which is a continuation-in-part of application No. 14/325,397, filed on Jul. 8, 2014, now Pat. No. 9,450,971, and a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 14/325,397 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703.

(60) Provisional application No. 61/843,915, filed on Jul. 9, 2013, provisional application No. 61/417,479, filed on Nov. 29, 2010.

(51) Int. Cl.
*G06F 3/04845* (2022.01)
*G06F 3/0354* (2013.01)
*G06F 3/01* (2006.01)
*G06F 3/041* (2006.01)

(52) U.S. Cl.
CPC ...... *G06F 3/03547* (2013.01); *G06F 3/04845* (2013.01); *G06F 3/04883* (2013.01); *H04L 63/083* (2013.01); *G06F 3/041* (2013.01); *H04L 2463/082* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 6,028,271 A * | 2/2000 | Gillespie | ............. | G06F 3/03547 178/18.06 |
| 6,209,102 B1 * | 3/2001 | Hoover | ............. | G06F 21/36 380/268 |
| 8,201,222 B2 * | 6/2012 | Inoue | ............. | H04L 63/08 726/4 |
| 8,402,533 B2 * | 3/2013 | LeBeau | ............. | G06F 21/629 726/17 |
| 8,819,812 B1 * | 8/2014 | Weber | ............. | G06F 3/017 726/19 |
| 2004/0034784 A1 * | 2/2004 | Fedronic | ............. | G07F 7/1025 713/186 |
| 2004/0123156 A1 * | 6/2004 | Hammond, II | ............. | H04L 63/08 726/4 |
| 2004/0221171 A1 * | 11/2004 | Ahmed | ............. | G06F 21/316 726/23 |
| 2006/0080263 A1 * | 4/2006 | Willis | ............. | H04L 63/10 705/76 |
| 2006/0090073 A1 * | 4/2006 | Steinberg | ............. | H04L 63/168 713/170 |
| 2008/0046982 A1 * | 2/2008 | Parkinson | ............. | H04L 9/3273 726/5 |
| 2008/0091639 A1 * | 4/2008 | Davis | ............. | G06Q 30/02 |
| 2008/0200310 A1 * | 8/2008 | Tagliabue | ............. | A61B 5/7405 342/357.57 |
| 2009/0037983 A1 * | 2/2009 | Chiruvolu | ............. | G06F 21/31 726/4 |
| 2009/0038010 A1 * | 2/2009 | Ma | ............. | G06F 11/3672 726/23 |
| 2010/0042954 A1 * | 2/2010 | Rosenblatt | ............. | G06F 3/0346 715/863 |
| 2010/0046806 A1 * | 2/2010 | Baughman | ............. | G06F 21/316 345/619 |
| 2010/0321304 A1 * | 12/2010 | Rofougaran | ............. | G06F 21/36 345/173 |
| 2010/0325721 A1 * | 12/2010 | Bandyopadhyay | ............. | G06F 3/04842 726/19 |
| 2011/0010209 A1 * | 1/2011 | McNally | ............. | G06N 20/00 706/47 |
| 2011/0102570 A1 * | 5/2011 | Wilf | ............. | G06F 3/017 345/156 |
| 2011/0105859 A1 * | 5/2011 | Popovic | ............. | A61B 5/165 600/301 |
| 2012/0102551 A1 * | 4/2012 | Bidare | ............. | H04L 9/3226 726/4 |

* cited by examiner

DEVICE, SYSTEM, AND METHOD OF USER AUTHENTICATION BASED ON USER-SPECIFIC CHARACTERISTICS OF TASK PERFORMANCE

CROSS-REFERENCE TO RELATED APPLICATIONS

This application is a Continuation of U.S. Ser. No. 16/597,860, filed on Oct. 10, 2019, which is hereby incorporated by reference in its entirety.

The above-mentioned U.S. Ser. No. 16/597,860 is a Continuation-in-Part (CIP) of U.S. Ser. No. 15/051,700, filed on Feb. 24, 2016, now U.S. Pat. No. 10,476,873 (issued on Nov. 12, 2019), which is hereby incorporated by reference in its entirety.

The above-mentioned U.S. Ser. No. 15/051,700 is a Continuation-in-Part (CIP) of U.S. Ser. No. 14/325,397, filed on Jul. 8, 2014, now U.S. Pat. No. 9,450,971 (issued on Sep. 20, 2016), which is hereby incorporated by reference in its entirety.

The above-mentioned U.S. Ser. No. 14/325,397 claims priority and benefit from U.S. 61/843,915, filed on Jul. 9, 2013, which is hereby incorporated by reference in its entirety.

The above-mentioned U.S. Ser. No. 14/325,397 is also an Continuation-in-Part (CIP) of U.S. Ser. No. 13/922,271, filed on Jun. 20, 2013, now U.S. Pat. No. 8,938,787 (issued on Jan. 20, 2015), which is hereby incorporated by reference in its entirety.

The above-mentioned U.S. Ser. No. 14/325,397 is also a Continuation-in-Part (CIP) of U.S. Ser. No. 13/877,676, filed on Apr. 4, 2013, now U.S. Pat. No. 9,069,942 (issued on Jun. 30, 2015); which is a National Stage of PCT International Application number PCT/IL2011/000907, filed on Nov. 29, 2011; which claims priority and benefit from U.S. 61/417,479, filed on Nov. 29, 2010; all of which are hereby incorporated by reference in their entirety.

The above-mentioned U.S. Ser. No. 14/325,397 is also a Continuation-in-Part (CIP) of U.S. Ser. No. 14/320,653, filed on Jul. 1, 2014, now U.S. Pat. No. 9,275,337 (issued on Mar. 1, 2016), which is hereby incorporated by reference in its entirety.

The above-mentioned U.S. Ser. No. 14/325,397 is also a Continuation-in-Part (CIP) of U.S. Ser. No. 14/320,656, filed on Jul. 1, 2014, now U.S. Pat. No. 9,665,703 (issued on May 30, 2017), which is hereby incorporated by reference in its entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device, for determining whether or not an electronic device is being used by a fraudulent user, and/or for differentiating between users of a computerized service or between users of an electronic device. For example, the present invention may provide device, system, and method of password-less user authentication and/or password-less detection of user identity, which may be based on unique user-specific biometric traits and/or behavioral traits; wherein the user-specific traits may be replaceable or changeable in certain circumstances (e.g., in contrast with human fingerprints, which belong to a person for his entire lifetime and cannot be changed or replaced).

The present invention provides devices, systems, and methods of password-less user authentication, and password-less detection of user identity. For example, a system or a computing device requires a user to perform a particular unique non-user-defined task, the task optionally being an on-screen connect-the-dots task or trace-a-pattern task. The system monitors user interactions, extracts user-specific features that characterizes the manner in which the user performs the tasks; and subsequently relies on such user-specific features as a means for user authentication, optionally without utilizing a password or passphrase. Optionally, a user interface anomaly or interference is intentionally introduced in order to elicit the user to perform corrective gestures, which are optionally used for extraction of additional user-specific features.

Some embodiments may include devices, systems, and methods of detecting user identity, differentiating between users of a computerized service, and detecting a possible attacker. The methods may include, for example: monitoring of user-side input-unit interactions, in general and/or in response to an intentional interference (e.g., input unit interference, output unit interference, on-screen interference, combined input-output interference) which may be intentionally introduced or injected or added to user-interface elements or to a flor of utilizing an application or website or electronic service. The monitored interactions (e.g., monitored gestures that the user makes, mouse movements, mouse clicks, touch-screen gesture, or the like) and/or their characteristics or attributes (e.g., velocity, acceleration, deceleration, accuracy, inaccuracy, timing, time gaps, smoothness, or the like) may be used for verifying identity of a user, or for differentiating or distinguishing between or among users, or for detecting a fraudulent human user or attacker or imposter, or for detecting a "bot" or automated script or robotic user or emulated user or simulated user or machine-based non-human user.

The present invention may provide other and/or additional benefits or advantages.

DETAILED DESCRIPTION OF THE PRESENT INVENTION

Figure 1:
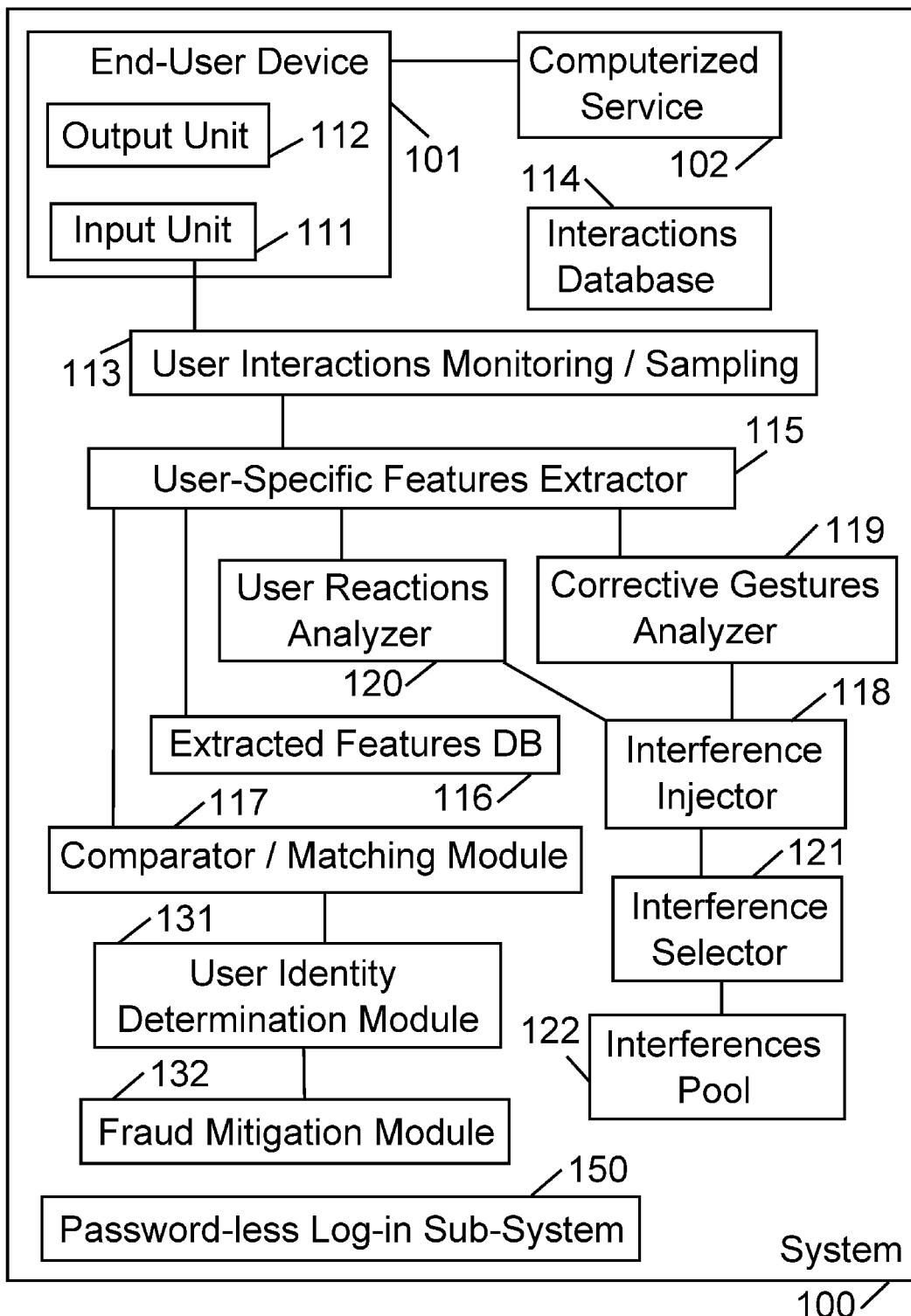
FIG. 1 is a schematic block-diagram illustration of a system, in accordance with some demonstrative embodiments of the present invention.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a notebook computer, a desktop computer, a cellular phone, a smart-watch (e.g., Apple iWatch), a fitness bracelet (e.g., similar to FitBit or JawBone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-use device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

In accordance with the present invention, system 100 may comprise a password-less log-in sub-system 150 (or a password-less user-authentication sub-system or module) which may enable system 100 and/or computerized service 102 and/or end-user device 101 to perform user authentication, or to authenticate or verify or confirm the identity of a user of end-user device 101 (or of computerized service 102). In some embodiments, the password-less log-in sub-system 150 may continuously operate without requiring the end-user to define, to remember and/or to type a PIN or password or pass-phrase; or may operate such manual entry of PIN or password or pass-phrase may be required only initially but not subsequently and not continuously.

Figure 2:
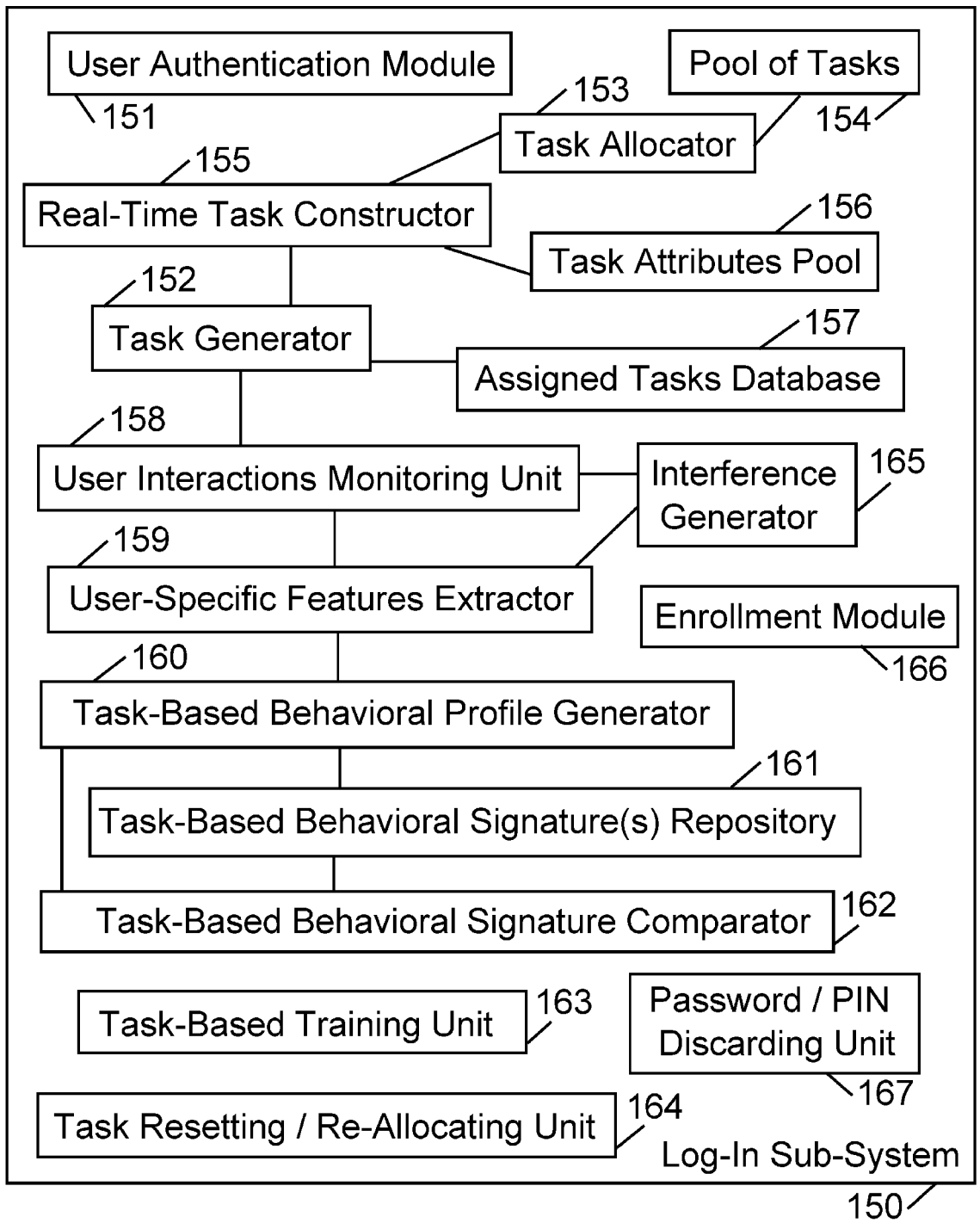
FIG. 2 is a schematic block-diagram illustration of password-less log-in sub-system, in accordance with some demonstrative embodiment of the present invention.

Reference is made to FIG. 2, which is a schematic block-diagram illustration of password-less log-in sub-system 150 and its associated components, in accordance with some demonstrative embodiment of the present invention.

Sub-system 150 may comprise a user authentication module 151 to enable authentication of a user of the end-user device 101 (e.g., towards the computerized service, or towards the end-user device 101 itself), without necessarily requiring the user to define and/or remember and/or type a secret, a password, a pass-phrase or a PIN, or any shape or form or picture or image or drawing that the user is required to remember in his memory and later to draw or to convey based on his memory. For example, the sub-system 150 may utilize a Task Generator 152 to generate a task (e.g., an on-screen "connect the dots" task, or "trace a route" task), which requests the user of the end-user device 101 to perform a particular task, by utilizing an input unit (e.g., mouse, touch-pad, touch-screen) of the end-user device 101; and may monitor and track the precise manner (e.g., gestures, interactions, device movements during the interaction and any other type of data that the device's sensors collect or produce during the interaction, and/or immediately prior to the interaction, and/or immediately after the interaction; including, but not limited to, data collected by or monitored by an accelerometer, a gyroscope, an orientation sensor, or the like) in which the user performs the requested task; and may analyze the monitored interactions to extract from them user-specific characteristics or user-specific features or user-specific profile; which in turn may be used as user-identifying profile, instead of a password or in addition to a password. The present invention may thus comprise and enable cognitive behavioral biometric profiling of a user, or of multiple users.

In a demonstrative example, end-user device 101 may comprise a touch-screen. Any user that attempts to log-in to the end-user device, or to an application in this device or to a service that this device controls or is associated with, may optionally be requested to enter a username; and then, may be required to perform an on-screen task, for example, using a finger to touch the screen and to follow a pattern or image or on-screen structure or on-screen animation that have particular locations and/or timing.

In a demonstrative example, for example, the touch-screen displays a first icon or character ("Dot 1"); the user touches that on-screen circle with his finger, and does not lift his finger from the touch-screen; the touch-screen displays a second icon or character ("Dot 2"); the user drags his finger on the touch-screen, from Dot 1 to Dot 2, and continues to keep his finger on the touch-screen at all times; the touch-screen then displays a third icon or character ("Dot 3"); the user then drags his finger on the touch-screen, from Dot 2 to Dot 3, and continues to keep his finger on the touch-screen at all times; the process repeats for a pre-defined number of icons or characters of "Dots", for example, 7 or 10 such Dots, which have different on-screen locations. Optionally, the entire batch or series of Dots, if followed correctly, resembles a generally-recognizable image or pattern or shape, for example, a star, a heart, a square, a triangle, a rectangle, an oval, a circle, a polygon, a pentagon, a hexagon, a particular letter of the alphabet (e.g., the letter "U" or "P"), a particular digit or number (e.g., the number "5" or "9"), a particular character or symbol (e.g., the character "@" or the character "&"), a series of letters and/or digits and/or characters and/or symbols, a word, a phrase, or the like.

It is clarified that the Dots or character(s) mentioned above are only a non-limiting example; other on-screen indicators may be used, for example, starts, circles, light-bulbs, glowing circles, asterisks, rotating cylinders, infinity symbol, using two or three fingers to collapse together two or three (or multiple) dots, question marks, arrows, small images or animated items, or any other suitable on-screen indicators or items or objects.

In some embodiments, the entire batch or the pattern of multiple Dots, that is presented for a user gradually in a staggered manner on the screen and which requires the user to follow with his finger or fingers (on the touch-screen or touch-pad) or with his hand (on a mouse), may be different from user to use, or from usage-session to usage-session, or may have other particular attributes which may be unique or different.

In some embodiments, optionally, a Task Allocator 153 may ensure that each user or each usage-session, or each login attempt, or each end-user device, is assigned a different task or a different shape or pattern pf icons (e.g., a star; a heart; a circle); and/or a different types of connect-the-dots icons (e.g., using Dots or "X" characters or "O" characters, using on-screen asterisks, using on-screen arrows, using consecutive digits or numbers); and/or may utilize staggered exposure of the subsequent icon at different rate, frequency and/or timing, or different time-delay after the user reaches each dot along the pattern; different size or scale or dimensions (e.g., a small Heart that occupies ¼ of the entire screen; or a larger Heart that occupies ½ of the entire screen); a different rotation of the shape or pattern (e.g., a Heart pattern; or a Heart pattern facing sideways or rotated by 90 degrees; or an upside-down Heart pattern, or rotated by 180 degrees); or the like. Optionally, the Task Allocator 153 may operate in conjunction with a Pool of Tasks 154 from which a particular task may be selected; and/or in conjunction with a real-time task constructor 155 which may assist the Task Generator 151 to construct on-the-fly a new task based on one or more Task Attributes selected from a Task Attributes Pool 156. Optionally, an Assigned Tasks database 157 may log and store data indicating which tasks have already been used or assigned or allocated to users; and/or which tasks are still available for allocation; and/or which particular task is allocated to which particular user or device or usage-session or application.

In some embodiments, a first user may be assigned a first unique on-screen task that has a first set of values of the above attributes (e.g., connect-the-dots of a Heart shape comprised of 7 dots to be connected); and a second user may be assigned a second unique on-screen task that has a second set of values of the above attributes (e.g., connect-the-dots of a Heart shape comprised of 9 dots to be connected); and a third user may be assigned a third unique on-screen task that has a third set of values of the above attributes (e.g., connect-the-dots of a Star shape comprised of 8 dots to be connected).

In some embodiments, a first login attempt to the computerized service may be assigned a first unique on-screen task that has a first set of values of the above attributes (e.g., connect-the-dots of a Star shape comprised of 6 dots to be connected); and a second login attempt to the computerized service (from the same end-user device; or from any other end-user device) may be assigned a second unique on-screen task that has a second set of values of the above attributes (e.g., connect-the-dots to form the number "6" comprised of seven dots to be connected); and a third login attempt to the computerized service (from the same end-user device; or from any other end-user device) may be assigned a third unique on-screen task that has a third set of values of the above attributes (e.g., connect-the-dots of an upside-down Heart shape comprised of ten dots to be connected).

In some embodiments, the system may select randomly or pseudo-randomly, a new unique on-screen task or a unique on-screen connect-the-dots pattern, for each user or for each new user that utilizes the end-user device and/or the computerized service; for example, by utilizing a permutations mechanism that mixes various attributes. For example, an on-screen task generator module may be associated with a pool of attributes for on-screen tasks. A first attribute may be the "shape" of the pattern, and may have seven possible values: a heart shape, a star shape, the digit "5", the letter "P", the symbol "@", the letter "M", and the digit "8". A second attribute may be the "rotation" of the shape, and may have four possible values: no rotation, or 90-degrees clockwise rotation, or 180 degrees rotation (upside down rotation), or 270 clockwise rotation. A third attribute may be the "number of dots" to be connected in order to complete the entire pattern; for example, having six possible values (e.g., 7 dots, or 8 dots, or 9 dots, or 10 dots, or 11 dots, or 12 dots). A fourth attribute may be the "scale" (or size) of the connect-the-dots pattern; for example, having three possible values (e.g., small scale that occupies ¼ of the screen; medium scale that occupies ½ of the screen; large scale that occupies ⅔ of the screen). A fifth attribute may be a value of a time-delay that has to elapse, between the user reaching a dot, and the task generator presenting or exposing the next dot; for example, having three possible values (e.g., time-delay of 0.1 seconds, or 0.15 seconds, or 0.2 seconds). A sixth attribute may be a binary attribute indicating whether the time delay between dot exposures should be consistent across all dots, or should be randomized. In the demonstrative example shown above, by using only these six attributes, the number of possible permutations or combinations is: 8×4×6×3×3×2=3,456.

It would be appreciated that defining a dozen or two-dozens of such attributes, and/or defining multiple possible values for each attribute, may enable the task generator to generate millions, or billions, or even trillions of unique combinations or permutations; thereby ensuring a unique task for each user or for each usage-session or each login-session or login-attempt, across a single end-user device, or across a single computerized service, or across multiple devices and/or services. It would also be appreciated that the pool of possible permutations or combinations may be easily increased or modified, for example, by adding new patterns or new shapes, new attributes, new values for existing attributes, or the like.

The Applicants have realized that each user, when presented with such on-screen task, may perform the task in a slightly different manner relative to other users who are requested to perform the exact same task. For example, the task may be an on-screen connect-the-dots of a medium-size Heart shape; user Adam may complete the task within 3.6 seconds; whereas user Bob may complete the task within 5.4 seconds. Additionally or alternatively, user Adam typically moves from Dot 1 to Dot 2 in a straight line; whereas user Bob typically moves from Dot 1 to Dot 2 along a curved non-linear route. Additionally or alternatively, user Adam typically waits at least 0.2 seconds upon reaching Dot 4; whereas user Bob typically continues to move his finger beyond Dot 4 without waiting at Dot 4 at all. Additionally or alternatively, user Adam typically presses forcefully into the touch-screen (which may be a touch-force screen able to measure the amount of force applied) upon reaching a Dot, whereas user Bob typically does not presses forcefully into the touch-screen.

The system may thus utilize a User Interactions Monitoring Unit 158 to monitor the gestures and intricate details of interactions in performing the on-screen task, thereby enabling a User-Specific Features Extractor 159 to extract or estimate or determine user-specific features or attributes, and thereby enabling a Task-Based Behavioral Signature Generator 160 to construct or generate or assemble from them a user-specific behavioral signature or behavioral profile or behavioral feature-set; which may optionally be stored in a local repository (e.g., within the end-user device) and/or in Task-Based Behavioral Signature(s) Repository 161, for example, a remote repository (e.g., on a remote server or web-server or "cloud computing" server). The user-specific behavioral profile or signature or feature-set may be utilized in order to distinguish or differentiate between a first use and a second user; or between a first user and all other users; or between a genuine user and a fraudulent user (attacker, human imposter, computerized imposter, "bot", automated script); or in order to authenticate a user to a computerized service or to an end-user device (e.g., without requiring a password or passphrase or PIN, or as an additional security measure to such password or passphrase or PIN).

For example, a Task-Based Behavioral Signature Comparator 162 may compare between: (a) a fresh or current or ad-hoc behavioral signature that is extracted from a current performance of a task by a user who contends to be the genuine user; and (b) a historical or original or previously-determined task-based behavioral signature which had been extracted and stored for that original or genuine user. If the two task-based behavioral signatures are identical, or match each other, or are different from each other only by a relatively-insignificant percentage value that is smaller than a pre-defined threshold, then the user is authenticated to the end-user device or the computerized service.

The Applicants have further realized that a human user may be "trained" by a Task-Based Training Unit 163 to more efficiently or more quickly or more precisely perform his user-specific on-screen task; in a manner that enables the system, after several iterations of such "training", to more accurately distinguish between "trained" user Adam, and non-trained user Bob. For example, user Adam may be the owner of a smartphone which is locked, and which requires the user to connect-the-dot of a gradually-exposed Heart shape in order to unlock the smartphone. User Adam is the genuine or legitimate use of the smartphone (e.g., the owner of the smartphone). When user Adam buys the smartphone and utilizes it for the first time, the smartphone selects autonomously the on-screen task, without asking User Adam which task he prefers, and without letting user Adam select or define his own preferred task. For example, the smartphone in its first activation (or, during a first launch of a security application in accordance with the present invention) may pseudo-randomly select a task of connect-the-dots of an upside-down Heart shape comprising eight Dots that are gradually exposed. In the first few times, user Adam may need five seconds to complete the on-screen tasks. After a few such "unlock the smartphone" sessions, or within a few days, the time that it takes user Adam to complete the task may significantly decrease; user Adam may already continue from Dot 1 to the approximate location of Dot 2 based on his previous experience from previous unlocking sessions, even without waiting for Dot 2 to become visible or exposed; user Adam may be more accurate and more precise in his movements, may not "miss" a Dot; and may generally exhibit more proficiency, accuracy and efficiency in performing the on-screen task and completing it.

In a demonstrative example, user Adam leaves his smartphone on the table at a coffee-shop and goes to buy a drink; a neighboring user Bob captures the smartphone and attempts to unlock it. The smartphone shows to user Bob the same connect-the-dots on-screen task, as a condition for unlocking the smartphone. However, two major differences exist between Adam and Bob: firstly, each one of them has a unique set of behavioral and cognitive abilities, enabling the system to differentiate between their performance of the same on-screen task; and enabling the system to refuse to unlock the smartphone for Bob, whose usage characteristics are different from Adam's (e.g., curves routes between dots instead of linear routes between dots; different delay after reaching each dot). Secondly, the already-trained user Adam, typically completes the task more quickly and in a more precise and accurate manner having specific traits of an "experienced" user, which are distinguishable (by the system) from the usage traits of Bob who is untrained with regard to performing the particular on-screen task. The system may thus refuse to unlock the smartphone for Bob, who fails to perform the same on-screen task in an entirely identical manner as Adam does.

In some embodiments, the system may learn on-the-fly the particular traits in which a new user performs an on-screen task, and may use them immediately (e.g., starting from the first or second iteration) for user authentication or for user identity detection. In other embodiments, the first K iterations of performing the on-screen task (e.g., K being an integer smaller than 50, or smaller than 20, or smaller than 10; for example, K being equal to 4 or 5 or 8), the system may only "learn" the particular characteristics of the manner in which user Adam performs and/or completes the task, without yet relying on them for actual user authentication; and only after such quota of training iterations are completed, or only if the system identifies sufficiently-unique user-specific features, only then would the system proceed to rely on the unique manner of performing the on-screen task as reliable means for user authentication.

For example, in some embodiments, the system may activate the security feature of the present invention; may then still require both manual entry of username and manual entry of password in order to access the computerized service or end-user device, and may also request the user to perform the on-screen task while logging in (or immediately prior to, or after, logging-in), but without yet relying on the on-screen task performance for actual user authentication, and only monitoring and "learning" the user-specific traits while also at the same time "training" the user to perform the on-screen task more efficiently; and only after K iterations of performing the on-screen task without utilizing it for authentication, or only after K successful logins that included the on-screen task, only then would the system modify its log-in process or authentication process, to require the user to enter his username and to perform the on-screen task, without requiring any more the user to enter any password. In some embodiments, the username may be entirely skipped or obviated, for example, in a use-case in which the present invention is utilized for unlocking a smartphone or for unlocking another electronic device; and/or in a use-case in which additional features (e.g., a fingerprint scan, a retina scan) are also used as part of a log-in process or an authentication process.

In accordance with the present invention, the particular and personal manner in which a user performs the on-screen task or challenge, is a user-specific trait that may be used for user authentication, and/or for distinguishing among users, and/or for confirming user identity, and/or for detecting a potential attacker or imposter (which may be human, or may be machine-based).

In accordance with the present invention, the user (or any user) does not select his own on-screen task or pattern from a pool of available (or offered) tasks or patterns; and the user does not modify the on-screen task, and does not replace it with another on-screen task; and does not edit, define and/or create by himself the on-screen task and/or pattern. This is in direct contrast with a password, a PIN or a passphrase, which are user-generated or user-defined, and which the user then needs to remember and to consciously convey (e.g., manually enter). Rather, in accordance with the present invention, the system automatically and autonomously generates (e.g., for each user, or for each device, or for each service) a pseudo-random on-screen task and/or pattern, or the system automatically and autonomously generates selects or defines such on-screen task and/or pattern for each user (or for each device or user or service) based on pre-defined attributes or criteria; and in some embodiments, the system does not allow and does not enable a user to switch or to modify the on-screen task or pattern that were allocated to him.

In some embodiments, optionally, the system may utilize a Task Resetting/Re-Allocating Unit 164 to allow or enable a user to switch or reset or replace an existing on-screen task with another, new, on-screen task (e.g., having a different connect-the-dots pattern and/or attributes), if one or more conditions are met; for example, if the end-user device (e.g., smartphone or tablet) is lost or stolen, and the user wishes to increase security of a replacement device by obtaining a new personal on-screen task that would be newly allocated to him by the system (for example, to prevent the thief who stole the smartphone, to "train" himself on the on-screen task of the stolen device and then apply the same behavior in order to attack the new device).

The present invention may thus enable to create and to utilize, a personal and unique and user-specific biometric trait or identifier (namely, the precise manner in which a user performs the on-screen task which is also unique to him), which is replaceable and changeable upon request; and this is in direct contrast with a human fingerprint, which is also a personal user-specific unique trait, but which is not replaceable and which follows a person "for life" without the ability to be replaced if the situation arises and such replacement would actually be desirable. For example, once a fingerprint of user Adam is "lifted" by attacker Bob from a dusty book that user Adam touched, the "lifted" fingerprint may be maliciously used by attacker Bob in order to gain access to various fingerprint-enabled devices of services of user Adam; without the user Adam ever being able to change or replace his own fingerprints. In contrast, if an attacker manages to imitate or duplicate the precise manner in which user Adam performs the on-screen task, then user Adam may request the system to issue to him a new on-screen task that would trigger him to perform a new, unique, manner of performing the new task, which the attacker cannot duplicate or replicate merely by already having duplicated the previous manner of performing the previous task.

The present invention may enable to create and to utilize a personal and unique and user-specific biometric trait or identifier, which may not be susceptible to duplication or copying; in direct contrast with a human fingerprint, which is also a unique biometric trait but which can be copied or duplicated by some attackers.

The present invention may optionally be utilized in conjunction with an existing smartphone, tablet, or other configuration of end-user device, without the need to necessarily add or install or connect a new biometric sensor (e.g., a fingerprint scanner or reader); thereby allowing, for example, low-cost deployment, efficient deployment, and/or small form-factor deployment of systems that utilize the present invention.

Some embodiments of the present invention may optionally utilize a two-fold mechanism, in which the user is required to perform an on-screen task, while also an interference or aberration is injected to the user-interface or to the task itself by an Interference Generator 165. For example, optionally, while the user is performing the on-screen task (e.g., dragging his finger from Dot 3 to Dot 4 of the Heart shape), Dot 4 may suddenly deviate or move to a different location, thereby requiring the user to notice the aberration and to react to the aberration (e.g., by performing corrective manual gestures). As another example, an interference may comprise displaying of the shape or patterns, or lines or curves or portions thereof, at a different speed or rate or timing, relative to the speed or rate or timing in which the Dots are gradually lit or exposed or shown or become visible. Other suitable aberrations or interferences may be used.

The user's reaction to the aberration, the attributes of the reaction (e.g., how long it took the user to notice and/or to correct), and the manner and attributes of the corrective action(s), may be analyzed and extracted and used as additional user-specific traits, in order to generate a user-specific profile that is more reliable and/or which relies on an increased depth of user-specific data, or is based on a larger user-specific data-set of user-specific features. In some embodiments, the injection of an aberration (or multiple aberrations) to the performance of the on-screen task, may increase the entropy of the system, and/or may increase the uniqueness of the manner in which the specific user performs the on-screen task presented to her; and/or may assist in "training" the particular user to be different and unique relative to other users; and/or in order to more efficiently identify or detect an attacker or an imposter.

In a demonstrative example of how an aberration may contribute to the above efficiency factors, user Adam owns a tablet which is unlocked by having Adam trace a connect-the-dot pattern that is Heart shaped and which includes 8 dots, that light-up (or become exposed or visible) at a particular time-interval or time-gap. An aberration may be, for example, a surprising movement of Dot 5 out of the eight dots; or a delayed exposure of Dot 7 of the eight dots. A genuine, trained, user (Adam) would react to this aberration differently from a first-time user (e.g., Bob the attacker or imposter). For example, Adam may continue to drag his finger from Dot 4 to the "original" (non-interfered) location of Dot 5 which user Adam is used to know from previous sessions; in contrast attacker Bob is non-trained, and will move his finger to the "interfered" new location of Dot 5, thereby indicating that Bob is not the genuine "trained" user Adam, but an imposter. Similarly, the user Adam may move his finger from Dot 6 to Dot 7 immediately, even though Dot 7 is not even lit or shown yet (due to a "delayed exposure" injected anomaly); whereas attacker Bob, who is not trained with performing the on-screen task, would patiently wait an additional 0.5 seconds until Dot 7 is exposed and lit, thereby indicating that user Bob is a non-trained attacker. Accordingly, the selective injection of interferences into the input/output of the on-screen task performing process, may increase the granularity and accuracy of the user-specific traits that are extracted; and/or may further contribute to improved detection of an attacker, an imposter, a first-time human user, a non-trained human user, an automatic script, a "bot" or a machine or emulator, or other non-genuine or unauthorized user(s).

In some embodiments, the requirement for a use to perform the on-screen task, may be additional to or alternative to other authentication methods (e.g., entering of a password or passphrase or PIN), or may be cumulative or augmenting to various other types of user authentication and/or fraud detection.

In some embodiments, the requirement for a user to perform the on-screen task, may be utilized as one of the steps in a two-step (or multi-step) authentication process; or may be utilized as one of the factors in a two-factor (or multi-factor) authentication process.

In some embodiments, the requirement for a user to perform the on-screen task, may be utilized as a "secret question" in a password recovery or password reset process; namely, as one of the means for the user to confirm his identity to a system in order to reset or recover a forgotten password, or in order to reset a defective (e.g., non-working) password. For example, when opening an email account, the user may define a username and a password; and may select a conventional password-recovery or password-reset question (e.g., "on which street did you grow up"), and/or may request to be allocated a unique on-screen task that the user would later have to complete in his user-specific manner in order to trigger password recovery or password reset. In the email account set-up stage, the system may immediately allocate to the user a unique on-screen task (e.g., connect-the-dots pattern); may require the user to immediately perform the task at least one time, or at least K times (e.g., for initial "training"); and may store the user-specific traits of the performance of the task as unique identifiers, that would later be used as a challenge to the user who requests to reset or recover his password or credentials.

The present invention may provide a log-in process, or sign-in process, or authentication process, which is based on extraction of a user-specific behavioral trait, which is extracted from user gestures when the user is requested to complete or to perform a particular computerized task or on-screen task (typically being a user-specific task that is unique to the user and/or to the device and/or to the user session, yet is repeated at each authentication session of the same user on the same device); the on-screen task being defined exclusively by the system and not by the user (in contrast with a user-defined password); the on-screen task being a replaceable task which may be discarded and replaced by another on-screen task for the same user if certain conditions are met (e.g., if the electronic device is stolen or lost or destroyed). This method may enable a password-less or PIN-less log-in process or authentication process; or may be used as an augmentation to other authentication methods or in combination with other authentication methods (e.g., password entry; physical token; two-step authentication; password entry; PIN entry; answering pre-defined security questions).

In some embodiments, the on-screen task generator may generate a unique on-screen task which elicits the user to react and to perform and complete the task in a particular behavioral manner which is unique relative to other users or relative to the entire population of users. For example, in some embodiments, the system may select or may generate a different task for each user, such that the same task would repeat consistently for that user, when he attempts to access a particular service (e.g., an email account, or a banking account), regardless of the particular device that the user is utilizing (smartphone, Tablet 1, Tablet 2); thereby providing a cross-platform password-less PIN-less authentication process which may be platform-agnostic or platform-independent. In some embodiments, the system may select or may generate a different task for each device, such that the same task would repeat consistently for that device, whenever a user (any user) attempts to access or unlock the device (e.g., attempts to unlock a smartphone or tablet); regardless of the identity of the user who is attempting to authenticate (legitimate user or attacker); thereby providing a password-less PIN-less authentication process that enables only the genuine user to unlock the device or to access the device.

The on-screen task may be, for example, a task in which the user is required to track with his finger an on-screen pattern or shape or line(s); or is required to connect-the-dots on a touch-screen or on a computer screen; or is required to connect dots or symbols which are gradually exposed or become visible in a staggered manner. The user does not define and does not select the particular on-screen task, which is automatically generated and allocated to him by the system. Accordingly, the user does not even need to remember or to memorize the particular task or any "preferred way" to perform the task, since the task is presented to the user in subsequent login sessions or login attempts, with integrated or built-in "instructions" or guidelines how to complete the task without the need to remember or to memorize any data-item or password or PIN or a previous-manner of completing the same task.

In some embodiments, the system may "train" the user, over K iterations, to efficiently and proficiently perform his unique on-screen task; thereby "training" the user to be familiar with his personal task, and allowing his manner of performing that task to be more consistent, un-changing, and even more unique as a "behavioral signature" relative to the rest of the population.

In some embodiments, the authentication process may utilize: (a) the fact realized by the Applicants, that each user performs a particular task differently and uniquely relative to other users; (b) the fact realized by the Applicants, that a user who "trained" to perform his particular task, performs that task in a more proficient or more efficient or more accurate manner, relative to that user performing a new task that he encounters for the first time; (c) optionally, the fact realized by the Applicants, that injecting an input/output interference or anomaly or aberration, to the performance of the task, may further contribute to the uniqueness of the user-extracted traits or the extracted "behavioral signature", and/or may further improve the differentiation between the legitimate user and other user(s) such as an attacker or impostor.

The present invention may thus "learn" or deduce, over multiple iterations or log-in sessions, the particular "behavioral signature" of each user, reflecting the particular's user attributes of his unique manner of performing the task; and such "behavioral signature" may be stored in a long-term repository, a short-term repository, a local repository within the end-user device, a remote repository on a remote server or a "cloud computing" server, or the like.

During a subsequent log-in attempt or access attempt or authentication attempt, the system may present the same task for performance and completion, and may monitor and track the current user-specific traits that are reflected in current user gestures, thereby generating a current, ad hoc, "behavioral signature" of the current user. The system may compare the current behavioral signature with the historic or previously-stored behavioral signature, in order to determine whether the current user who is attempting to access the service (or the device) is indeed the same human user as the human user who had been initially presented with the same task (e.g., upon activation or initiation of a user account for that service; or upon initial activation of the end-user device).

In some embodiments, optionally, the system may utilize an Enrollment Module 166 to perform an enrollment process; in which a new user is requested to perform the same user-specific task, several times (e.g., K times, five times, ten times) in a row, in order to rapidly establish a data-set of generally-consistent user-specific traits that characterize that user when he performs that task; optionally discarding the first one or two or three iterations data; and/or optionally using a weighting formula to allocate a greater weight to latter task-performing sessions, and to allocate a smaller weight to earlier or initial task-performing sessions. In other embodiments, no such formal or visible "enrollment process" is needed; and rather, the system may autonomously learn over time, or over K iterations or login sessions or login attempts, to extract or to identify the consistent user-specific traits.

In some embodiments, the system may require the user to enter a password/PIN and also to perform the allocated user-specific task; and this may be performed across multiple, K, iterations of login sessions. Then, after K iterations (e.g., after 8 or 10 successful logins, that involved both password/PIN entry and also on-screen task completion), the system may determine the user-specific behavioral signature, which is reliable and strong since the user is already "trained" in performing that task for several times. In some embodiments, from that point in time and onward, the system no longer requires the user to enter a password/PIN for authentication or for accessing a service; but rather, the system relies on the behavioral traits of the user completing the task, as a password-less authentication means.

In some embodiments, optionally, once the system determines that the behavioral signature of the user is sufficiently unique or strong or reliable, the system may even utilize a Password/PIN Discarding Unit 167 to discard or delete or erase or over-write the original password/PIN of the user (or its hash value, or other indication or equivalent of it); such that no user, not even the legitimate user himself, would be able to access the account using the password/PIN; but rather, only the correct behavioral performance of the task would be the condition for authorizing access or for rejecting a login attempt. In some embodiments, if the end-user device is stolen or destroyed or lost, or if the user's record is destroyed or is damaged, the system may provide a suitable solution; for example, allowing the user to reset his registration with the system (e.g., optionally requiring the user to present certain credentials), and initializing the process from the beginning (e.g., setting a password; training the user with a new task; and then discarding also the new password, and relying exclusively on the behavioral traits of performing the new task).

The present invention may be utilized in a variety of implementations and systems. In a first example, a tablet or a smartphone or a dashboard or a device having a touch-screen may be placed at an entrance to an access-controlled physical area (e.g., building, room, floor in a building, organization, office); and users may be required to perform an initial advance registration process, such that each authorized user (who is allowed to enter the physical area) would be associated with a particular user-specific task that can be performed on that touch-screen. Subsequently, that touch-screen device may be used as an authentication terminal, requiring each guest or visitor to authenticate by entering his name or username, then presenting to the user his suitable pre-defined on-screen task, and then allowing (or blocking) the user's physical entry based on the behavioral traits of how the user performs that task. This may be an addition to, or an alternative to, other user authentication methods for entering a secure area or a controlled-access physical location (such as, showing a badge or an I.D. card; scanning a barcode; showing a token; retina scan; fingerprint scan; voice recognition or voice signature; or the like).

In another example, a tablet or a smartphone or a dashboard or a device having a touch-screen may be embedded in (or connected to) a vehicle, or a vehicular dashboard; such that starting the vehicles motor, and/or driving the vehicle, may be conditioned upon the user (e.g., the driver) performing the pre-defined task on the touch-screen, in the same manner that would yield the same behavioral signature that had been defined for the legitimate user (e.g., the car owner or the previously-authorized driver). The device of the present invention may thus be utilized in order to allow or to block access to a vehicle, or in order to allow or block an attempt to start a vehicle or to drive a vehicle. Similarly, the invention may be used with allowing or blocking access to various electronic devices, electric devices, kitchen appliances, household appliances (e.g., a television set, a smart television), a gaming device or gaming console, or the like.

It is noted that for demonstrative purposes, some portions of the discussion herein may relate to an on-screen task that is performed via a touch-screen; or to a "connect the dots" task, or to trace an on-screen trail; however, other suitable tasks may be used, which may not necessarily involve connecting of dots or other items, and which may not necessarily require or involve a touch-screen. In a first example, the user-specific task may require the user to utilize a mouse of a computer, in order to trace an on-screen trail or route, or in order to connect dots or icons on the screen, vie mouse gestures or via touch-pad gestures, and without dragging a finger over a touch-screen. In a second example, the user may be requested to perform certain gestures on the touch-screen or via another input unit (mouse, keyboard), such as typing a particular phrase via a physical keyboard or an on-screen keyboard, as an input task that is analyzed and from which user-specific behavioral traits are extracted and are then assembled or fused into a user-specific behavioral signature which is subsequently used for user authentication.

Figure 3:
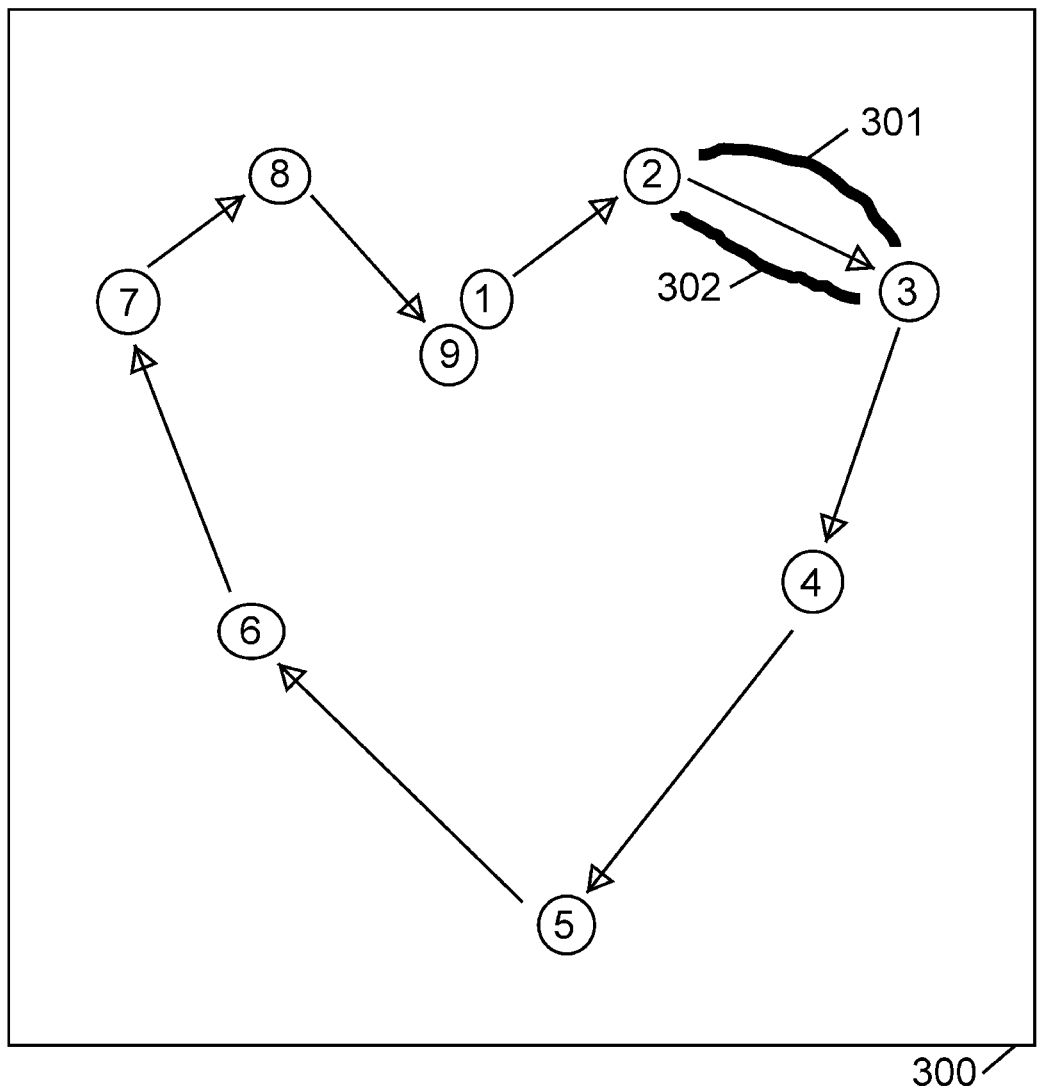
FIG. 3 is a schematic illustration of a touch-screen demonstrating an on-screen task for user authentication, in accordance with some embodiments of the present invention.

Reference is made to FIG. 3, which is a schematic illustration of a touch-screen 300 demonstrating an on-screen task for user authentication, in accordance with some embodiments of the present invention. The task may be, for example, a "connect the dots" on-screen task. Firstly, only Dot 1 is shown to the user, who is requested to place his finger on Dot 1. Then, while the user keeps his finger onto Dot 1, the second dot (Dot 2) becomes visible, and the user is supposed to drag his finger from Dot 1 to Dot 2, generally along the arrow shown between Dot 1 and Dot 2. When the user's finger reaches Dot 3, optionally after a pre-defined delay, Dot 3 may become visible, such that the user needs to draft his finger from Dot 2 to Dot 3. The process may continue similarly until Dot 9 is reached. Optionally, the route that was traced by the user may be drawn on the screen; or alternatively, the traced route may not be drawn and the screen may show only the Dots without their connections. Optionally, only upon completion of the entire pattern of nine dots, the entire trace is shown or illuminated, to indicate to the user that he completed a Heart shape (in the shown example).

It is noted that two different users may drag their finger differently between dots. For example, user Adam may drag his finger from Dot 2 to Dot 3 along a generally-curved line 301; whereas user Bob may drag his finger from Dot 2 to Dot 3 along a generally-straight line 302; thereby enabling the system to distinguish between users, or to distinguish between these two users, or to distinguish between user Adam and all other users, or to distinguish between user Bob and all other users.

In some embodiments, a "trained" user (e.g., the genuine user) who performed this task several times or many times, may already be trained to use the curved line 301 since he intends to draw the already-familiar Heart shape that he trained to draw in the past; whereas, a fresh user or non-trained user, for example attacker or impostor who attempts to perform this task for the first time, may draw the straight line 302. Additionally or alternatively, the timing of the tracing may be different; such that the original or genuine user may proceed with the tracing task more rapidly than an attacker, and may even proceed to trace towards the correct direction before the next Dot becomes visible to him; whereas an attacker may linger and wait for each subsequent Dot to illuminate in order to trace a route towards it. Accordingly, the system may differentiate between user Adam and user Bob, or between the original genuine user and an attacker or impostor.

Other suitable shapes, tasks and/or challenges may be used.

In some embodiments of the present invention, a machine-implemented method may enable or may make or may force users to behave (or to react) differently in a distinctive and user-specific manner, for the purpose of password-less login or password-less authentication (e.g., towards an end-user device, or towards a local service or local application running on the end-user device, or towards a remote service or remote application that is accessible through the end-user device), based on changeable biometrics or replaceable biometrics. For example, the method may comprise: (a) autonomously selecting or allocate a different specific task to each device or to each user; (b) optionally, training each specific user to perform his allocated task, over at least K iterations; (c) monitoring user interactions, and learning or determining or generating a behavioral cognitive biometric signature of the trained user; (d) testing against it any fresh attempt to perform the user-specific login task (or user-authentication task, or device-authentication task), optionally without requiring the user to define and/or to remember and/or to enter any password or PIN. Optionally, if the biometric signature is stolen or lost or becomes defective (e.g., not working) or needs to be reset or replaced for any reason, then a new task may be selected and allocated, and a new behavioral cognitive biometric signature will be trained and stored for that specific user or device.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

It is noted that in accordance with the present invention, the "user interaction data" may comprise, for example, any data that is sensed or captured by the end-user device or by any sensors thereof or by other (e.g., external) sensors, and which may relate directly or indirectly to the user interaction or to the input-output exchange between the user and the device (or the service). For example, data sensed by the accelerometer and/or gyroscope(s) and/or orientation sensor(s) of the end-user device, during the interaction and/or shortly prior to the interaction and/or shortly after the interaction, may be utilized as part of the data from which a user-specific behavioral profile or cognitive biometric profile is generated; for example, identifying that user Adam typically orients his smartphone at a 30 degrees angle during the actual touch-screen interaction; identifying that user Bob typically rotates his smartphone clockwise by 20 degrees immediately prior to performing a touch-screen gestures; identifying that use Carl typically causes a movement sideways, or a movement to the left side, or a tilting to a certain direction, of the entire electronic device, prior to the interaction (the task performance) or immediately prior to it or immediately after it; or the like.

It is noted that in some embodiments, the system and method of the present invention may utilize the password-less log-in or the password-less user authentication or controlled access, in conjunction with sensing and/or analyzing other user-specific features or biometric traits; for example, using an image or photo or video of the user (e.g., before or during or after the actual interaction is performed), or using an audio or speech utterance or voice utterance by the user (e.g., before or during or after the actual interaction is performed). For example, the image or voice of the user, may be utilized as an assisting parameter in the decision whether or not the current user, who is performing the required task by interactions or gestures, is indeed the genuine user. For example, if the system of the present invention is utilized in order to authorize or reject the access of a user into a building or a vehicle, then utilization of the user's image and/or voice may further be used as part of the decision-making process in which the user is authenticated or is blocked.

In some embodiments, the user-specific task that is allocated by the system to a user or to a device, may be or may include, for example: a task to draw or to follow an on-screen pattern or shape that is similar to the digit "8" or to the letter "O" or to the character "&" or to the character "@" or to the mathematical symbol for infinity; wherein the user is required, by the task generator unit, to draw or to trace the drawing by using only one finger, or by using two fingers, or by using three fingers, or by using four fingers, or by using five fingers. Optionally, the monitoring of user interactions may comprise, for example, the additional data that may be collected or sensed with regard the relative progress or the relative movement of each finger relative to other finger(s); and/or additional information which the system may deduce, with regard to the length or relative length of finger(s), based on the relation or the rate of progress of such fingers on the touch-screen. In another demonstrative example, the user-specific task may require the user to drag or move multiple dots (e.g., three dots, or four dots) towards a central point or towards a target point on the touch-screen by utilizing multiple fingers; thereby enabling the system to extract unique user-specific features with regard to the manner of performing the task, and optionally with regard to actual characteristics of the fingers of the user or his hand. In some embodiments, such extracted data may also be paired with, or augmented with, data sensed by accelerometer and/or gyroscope and/or device-orientation sensor, during the task performance and/or immediately prior to task performance and/or immediately after task performance; thereby augmenting and fine-tuning the user-specific profile, or thereby enabling finer distinction among multiple users.

The Applicants have realized that conventional user-authentication systems typically utilize for authentication purposes a "something you know" data-item (e.g., a user-defined password), and/or a "something you have" item (e.g., a physical key, or a magnetic card, or a human fingerprint). In contrast, some embodiments of the present invention may perform user authentication based on "something you are", or a cognitive behavioral trait that is utilized as a user-specific biometric feature or signature, which cannot be accurately imitated by other users; and which may optionally be reset or replaced (e.g., by generating a replacement task) if the need arises.

In some embodiments, the first K iterations of performing the task, by each user or for each new device, may be regarded by the system as "training sessions" or "learning sessions", in which the system allows the user to become trained or proficient in performing the task; without yet utilizing the initial interactions (during those K iterations, or during some of them) for constructing the user-specific biometric profile or signature; and only after K iterations elapse, or only after the system determines that the user is sufficiently trained in performing the task, then the system generates the user-specific biometric profile based on user interactions that are performed while the user is already trained or proficient; optionally discarding the user interactions that were monitored during the training sessions, without using them for biometric profile generation.

Some embodiments may comprise a method for capturing and obtaining different data with regard to different users, by allocating to them different tasks. The Applicants have realized that it may be beneficial and advantageous not only to generate and to utilize the user-specific cognitive behavioral biometric profile, but also to significantly increase the possible data-set or the possible range of behaviors, thereby enabling the analysis unit or comparing unit or matching unit to operate more efficiently and/or more accurately.

The terms "mobile device" or "mobile electronic device" as used herein may include, for example, a smartphone, a cellular phone, a mobile phone, a tablet, a handheld device, a portable electronic device, a portable gaming device, a portable audio/video player, or the like.

The term "pointing device" as used herein may include, for example, a mouse, a trackball, a pointing stick, a stylus, a joystick, a motion-sensing input device, a touch screen, a touch-pad, or the like.

The term "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from an authentication process. For example, after a login form was filled and submitted by the user, a demonstrative system may skip or not skip an additional authentication step (e.g., a security question) if the system recognizes the user as the genuine user.

Some embodiments may identify or detect a remote access attacker, or an attacker or a user that utilizes a remote access channel to access (or to attack, or to compromise) a computerized service.

In some embodiments of the present invention, a method comprises: differentiating between a first user and a second user of a computerized service, by performing: (a) autonomously selecting a unique and non-user-defined task, that is intended to be performed by a specific user via an input unit of an electronic device; (b) generating the task, and collecting user interactions data via the input unit while the user is performing the task; (c) repeating step (b) for at least N iterations for said specific user, wherein N is a positive integer; (d) during step (b) and during step (c), determining from said user interactions data a user-specific cognitive behavioral biometric profile; (e) storing the user-specific cognitive behavioral profile in a repository; (f) subsequently, generating said task again upon a subsequent request of a user to access said computerized service, and collecting fresh user interactions data from fresh performance of said task; (g) if the fresh user interactions data that was collected from said fresh performance of said task, does not match the previously-stored user-specific cognitive behavioral biometric profile, then un-authorizing access of the user to the computerized service.

In some embodiments, the task is unique to said user relative to all other users of the computerized service.

In some embodiments, the task is unique to said electronic device relative to all other electronic devices that access the computerized service.

In some embodiments, the task is both (i) unique to said electronic device relative to all other electronic devices that access the computerized service, and (ii) unique to said user relative to all other users of the computerized service.

In some embodiments, the task comprises an on-screen dot-connecting task.

In some embodiments, the task comprises an on-screen dot-connecting task in which all dots are visible to the user immediately upon commencement of the task.

In some embodiments, the task comprises an on-screen dot-connecting task in which only a single dot is visible to the user immediately upon commencement of the task, and each subsequent dot is exposed to the user gradually as the user connects each dot that was exposed to him.

In some embodiments, the task is generated by selecting at least: a particular shape from a pool of available shapes, a particular scale from a pool of available scales, a particular number of dots from a number-of-dots pool.

In some embodiments, the method comprises: while the user is performing the task, introducing an input/output interference that triggers the user to perform corrective gestures; extracting one or more user-specific features from said corrective gestures; taking into account said one or more user-specific features, that were extracted from said corrective gestures, during at least one of these steps: (i) during constructing the reference user-specific behavioral signature; (ii) during constructing the fresh user-specific behavioral signature.

In some embodiments, the method comprises: during a first K usage-sessions of the user with the computerized service, wherein K is a positive integer: (a) requiring the user to both enter a password and to perform the task; (b) relying on the password for user authentication towards the computerized service; (c) not-relying on the task for user authentication towards the computerized service; starting at the K+1 usage-session of the user with the computerized service: (i) enabling the user to authenticate towards the computerized service without entering any password, if the user performs the task in a manner that matches the reference user-specific behavioral profile.

In some embodiments, the method comprises: during a first K usage-sessions of the user with the computerized service, wherein K is a positive integer: (a) requiring the user to both enter a password and to perform the task; (b) relying on the password for user authentication towards the computerized service; (c) not-relying on the task for user authentication towards the computerized service; upon completion of the first K usage-sessions, discarding the password; starting at the K+1 usage-session of the user with the computerized service: (i) enabling the user to authenticate towards the computerized service without entering any password, if the user performs the task in a manner that matches the reference user-specific behavioral profile.

In some embodiments, said task is utilized for user authentication in addition to requiring the user to manually enter a password.

In some embodiments, said task is utilized for user authentication instead of requiring the user to manually enter a password.

In some embodiments, said task is utilized for user authentication as a condition for granting access to the user to a physical location.

In some embodiments, said task is utilized for user authentication as a condition for granting access to the user to a vehicle, or for allowing a user to drive or to mobilize a vehicle.

In some embodiments, said task is utilized for user authentication as part of a multi-factor authentication process.

In some embodiments, said task is utilized as a secret question that the user is required to successfully perform in order to reset user credentials.

In some embodiments, collecting the user interactions data comprises collecting user interactions data both (i) during performance of the task, and (ii) immediately prior to performance of the task; wherein generating the user-specific cognitive behavioral biometric profile is performed based on both (I) the user interactions during performance of the task, and (II) the user interactions immediately prior to performance of the task.

In some embodiments, collecting the user interactions data comprises collecting user interactions data both (i) during performance of the task, and (ii) immediately after performance of the task; wherein generating the user-specific cognitive behavioral biometric profile is performed based on both (I) the user interactions during performance of the task, and (II) the user interactions immediately after performance of the task.

In some embodiments, collecting the user interactions data comprises collecting user interactions data (i) during performance of the task, and (ii) immediately prior to performance of the task, and (iii) immediately after performance of the task; wherein generating the user-specific cognitive behavioral biometric profile is performed based on (I) the user interactions during performance of the task, and (II) the user interactions immediately prior to performance of the task, and (III) the user interactions immediately after performance of the task.

In some embodiments, collecting the user interactions data comprises both (i) collecting user interactions data via the input unit, and (ii) collecting one or more sensed parameters that are sensed via a sensor of the electronic device during task performance; wherein generating the user-specific cognitive behavioral biometric profile is performed based on both (I) the user interactions via the input unit during performance of the task, and (II) the one or more sensed parameters that are sensed via said sensor of the electronic device during task performance.

In some embodiments, collecting the user interactions data comprises both (i) collecting user interactions via the input unit, and (ii) collecting one or more sensed device-acceleration parameters that are sensed via an accelerometer of the electronic device during task performance; wherein generating the user-specific cognitive behavioral biometric profile is performed based on both (I) the user interactions via the input unit during performance of the task, and (II) the one or more sensed device-acceleration parameters that are sensed via said accelerometer of the electronic device during task performance.

In some embodiments, collecting the user interactions data comprises both (i) collecting user interactions via the input unit, and (ii) collecting one or more sensed device parameters that are sensed via a gyroscope of the electronic device during task performance; wherein generating the user-specific cognitive behavioral biometric profile is performed based on both (I) the user interactions via the input unit during performance of the task, and (II) the one or more device parameters that are sensed via said gyroscope of the electronic device during task performance.

In some embodiments, collecting the user interactions data comprises both (i) collecting user interactions data via the input unit, and (ii) collecting one or more sensed device-orientation parameters that are sensed via an orientation-sensing unit of the electronic device during task performance; wherein generating the user-specific cognitive behavioral biometric profile is performed based on both (I) the user interactions via the input unit during performance of the task, and (II) the one or more device-orientation parameters that are sensed via said orientation-sensing unit of the electronic device during task performance.

In some embodiments, collecting the user interactions data comprises both (i) collecting user interactions data via the input unit, and (ii) collecting one or more images of the user that are captured via an imager during task performance; wherein generating the user-specific cognitive behavioral biometric profile is performed based on both (I) the user interactions via the input unit during performance of the task, and (II) the one or more images that are captured visa said imager during task performance.

In some embodiments, the method comprises: if said user-specific cognitive behavioral biometric profile is compromised, then: (A) autonomously selecting a replacement unique and non-user-defined task, that is intended to be performed by the specific user via the input unit of the electronic device; (B) generating the replacement task, and collecting user interactions data via the input unit while the user is performing the replacement task; (C) repeating step (B) for at least N iterations for said specific user; (D) during step (B) and during step (C), determining from said user interactions a replacement user-specific cognitive behavioral biometric profile; (E) in a subsequent user-authentication session: generating the replacement task; based on monitored user interactions, generating a fresh ad-hoc cognitive behavioral biometric profile; and authenticating the user based on a comparison between the fresh ad-hoc cognitive behavioral biometric profile and the replacement user-specific cognitive behavioral biometric profile.

In some embodiments, the method comprises: if said user-specific cognitive behavioral biometric profile becomes non-usable, then: (A) autonomously selecting a replacement unique and non-user-defined task, that is intended to be performed by the specific user via the input unit of the electronic device; (B) generating the replacement task, and collecting user interactions data via the input unit while the user is performing the replacement task; (C) repeating step (B) for at least N iterations for said specific user; (D) during step (B) and during step (C), determining from said user interactions a replacement user-specific cognitive behavioral biometric profile; (E) in a subsequent user-authentication session: (i) generating the replacement task; (ii) based on collected user interactions data during performance of the replacement task, generating a fresh ad-hoc cognitive behavioral biometric profile; (iii) authenticating the user based on a comparison between the fresh ad-hoc cognitive behavioral biometric profile and the replacement user-specific cognitive behavioral biometric profile.

In some embodiments, the method comprises: upon loss or theft of said electronic device is lost or stolen, performing: (A) autonomously selecting a replacement unique and non-user-defined task, that is intended to be performed by the specific user via the input unit of the electronic device; (B) generating the replacement task, and collecting user interactions data via the input unit while the user is performing the replacement task; (C) repeating step (B) for at least N iterations for said specific user; (D) during step (B) and during step (C), determining from said user interactions a replacement user-specific cognitive behavioral biometric profile; (E) in a subsequent user-authentication session: (i) generating the replacement task; (ii) based on collected user interactions data during performance of the replacement task, generating a fresh ad-hoc cognitive behavioral biometric profile; (iii) authenticating the user based on a comparison between the fresh ad-hoc cognitive behavioral biometric profile and the replacement user-specific cognitive behavioral biometric profile.

In some embodiments, an apparatus comprises: a memory unit to store code; a processor to execute said code; an input unit to receive manual user interactions; a user-authentication unit to perform: (a) increasing a range of possible manual user interactions that are usable for automated distinguishing among different users, by autonomously selecting and allocating, to each user in a group of users or to each electronic device in a group of electronic devices, a unique task that is performed via an input unit; (b) collecting user interactions data, at least during performance of said unique task; (c) based on the collected user interactions data, generating a user-specific cognitive behavioral biometric signature; (d) subsequently, during a fresh attempt for user authentication: (i) generating said unique task; (ii) collecting fresh user interactions data at least during performance of said unique task; (iii) if the fresh user interactions data does not match said user-specific cognitive behavioral biometric signature, then rejecting the fresh attempt for user authentication.

In some embodiments, the apparatus comprises (or is connected to, or is comprised in, or is part of, or is operably associated with) a physical gate for blocking or allowing entrance (or exit, or passage) of a human to an access-controlled physical location.

In some embodiments, the apparatus comprises (or is connected to, or is comprised in, or is part of, or is operably associated with) a vehicular unit that is operably associated with an ignition unit (or an immobilizer unit) of a vehicle; wherein the apparatus is to block or allow ignition and/or mobilization and/or driving and/or other functions of said vehicle.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, logic units, memory units, storage units, wireless communication modems or transmitters or receivers or transceivers, cellular transceivers, a power source, input units, output units, Operating System (OS), drivers, applications, and/or other suitable components.

In accordance with the present invention, a method comprises: (a) storing a representation of a secret data-item of a particular user, wherein said secret data-item is one of: a password, a Personal Identification Number (PIN); (b) generating a user authentication session that requires said particular user to enter said secret data-item by performing a task comprised of on-screen operations in which said user drags or moves on-screen objects to input said secret data-item; (c) during said user authentication session, monitoring user gestures of user performance of said task; and extracting from said user gestures a behavioral characteristic that characterizes user performance of said task; (d1) determining whether or not said user gestures correspond to correct entry of said secret data-item; (d2) determining whether or not the behavioral characteristic that was extracted in step (c), matches a previously-stored reference behavioral characteristic that was extracted from past on-screen operations that were previously associated with said particular user during previous log-in sessions; (e) if the determining of step (d1) is negative or the determining of step (d2) is negative, then: generating a notification that user authentication is rejected.

For example, a user logs-in to his online bank account or email account or social network account, or to his electronic device. Optionally, the user may enter a username; or the device (or system, or service) may utilize a pre-defined username already filled out (e.g., based on a "cookie" data-item that indicates to the system that this is a returning user). The user has to input a secret data-item (PIN or password, or other secret string of characters). However, the user is not inputting the secret data-item via typing on a keyboard or keypad (neither physical, nor virtual, nor on-screen). Rather, the user operates one or more input-units of the electronic device that he is using, in order to complete a task that indirectly causes or indirectly involves indirect inputting of the characters of the secret data-item. For example, a set of on-screen reels or wheels or rotating elements are generated and shown, enabling the user to virtually rotate them by moving his finger on the touch-screen (or the touch-pad) or by utilizing a computer mouse or other pointing device or input unit; each such reel or rotating element shows thereon a set of digits and/or letters and/or characters, such that the user rotates each on-screen reel to a position that shows a particular character (e.g., at a central line). This way, the user indirectly enters each character, by rotating the on-screen reels, to form an on-screen representation of his secret data-item (PIN or password).

Once the user "submits" his current position of the on-screen task to the system (e.g., by clicking or tapping on a "submit" button or link or GUI element; or, upon automatic submission process once he rotated all the on-screen reels, one after the other), two checks are performed. Firstly, the system checks whether the content that the user has indicated via his interactions, matches the secret data-item. For example, if the user's password is "swordfish", the system checks whether the nine on-screen reels have been correctly rotated by the user to show that password in a single horizontal line across the nine reels. Secondly, the system checks whether the user interactions, as monitored and captured and logged during the rotating operations of the reels, enable extraction of a user-specific behavioral characteristic (or a set of characteristics) that match a previously-extracted characteristic that this particular user had exhibited when he had defined his reference password or PIN, and/or that he has exhibited in previous log-in sessions to that account or device.

For example, when user Adam had defined his original secret data-item, he rotated the on-screen reels (one by one) by pulling them vertically in straight (linear) gestures (e.g., dragging downwardly straight lines, vertically, downwardly, on the touch-screen; or on the touch-pad; or moving the mouse vertically in straight line), at high-speed (e.g., dragging at least N pixels per 0.1 seconds of interaction), and with average pause of less than T seconds between reels. In contrast, user Bob rotates the on-screen wheels slowly, by pulling them upwardly (and not downwardly as Adam does), slightly diagonally in direction (and not exactly vertically as Adam does), at a slower speed (e.g., moving them less than N pixels per 0.1 seconds of interaction), and with longer pauses between reels (e.g., average pause greater than T seconds between reels). Accordingly, if user Bob attempts to impersonate user Adam, and attempts to log-in into the system as if he was user Adam and by entering the secret data-item of user Adam, even when the entered secret-item is correct (e.g., matches the reference password or the reference PIN that had been defined by user Adam), the system can still differentiate and distinguish between the users, and may still raise a flag or generate a notification of a possible fraud, since the behavioral characteristic(s) that are extracted from the input-unit interactions performed by user Bob when he performs the task that corresponds to password entry, do not match those that were exhibited by (and extracted from interactions of) user Adam (the genuine user, the account owner) when Adam had defined his reference password or PIN and/or when Adam logged-in in recent or historical log-in sessions.

For example, the speed in which Adam rotated the on-screen reels, when he defined his original password, was 400 pixels per second; the average speed (or the median speed) that characterized Adam in his most-recent 20 log-in sessions was 394 pixels per second; and currently, in a fresh or current log-in attempt, by a user that claims to be Adam, the rotation speed is only 170 pixels per second. Similarly, when Adam defined his original password, and also in all the most-recent 15 log-in sessions of Adam, the on-screen reels where rotated downwardly (or: clockwise), whereas in a current or fresh log-in attempt the reels are rotated upwardly (or: counter-clockwise). Such differences may trigger the system to raise a flag of possible fraud, and/or to block or reject the log-in attempt, and/or to perform fraud mitigation operations, such as, to require the attempting user to utilize an additional authentication factor or to contact a customer service representative by phone.

In some embodiments, the task excludes and does not require typing of characters via a physical keyboard or via an on-screen keyboard; and/or, the task excludes and does not require typing of characters via a physical keypad or via an on-screen keypad. The task may comprise other suitable operations, such as: connecting on-screen dots or connecting on-screen objects in a manner that corresponds to character-by-character inputting of the password; completing a missing piece into a puzzle, out of several possibilities; selecting a picture out of several pictures and/or dragging it from a first on-screen location to a second on-screen location; or the like.

In some embodiments, said task comprises: requiring the user to rotate on-screen reels, each reel indicating at least letters and digits, each reel corresponding to one character of said secret data-item.

In some embodiments, monitoring user gestures of performance of said task, comprises: monitoring a rotation speed in which each of said reels is rotated by the user, and utilizing said rotation speed as a user-specific characteristic for user authentication.

In some embodiments, monitoring user gestures of performance of said task, comprises: monitoring a rotation direction in which each of said reels is rotated by the user, and utilizing said rotation direction as a user-specific characteristic for user authentication.

In some embodiments, said task comprises: generating an on-screen arrangement of digits and letters; requiring the user to input said secret data-item by drawing on-screen lines among consecutive characters of said secret data-item; determining a curvature level of said lines, and utilizing said curvature level of said lines as a user-specific characteristic for user authentication.

In some embodiments, the method comprises authenticating said user, or rejecting authentication of said user, based on a cumulative assessment that takes into account (i) the secret data-item that the user knows, and (ii) the specific behavioral way in which the user interacted with the electronic device to input said secret data-item.

In some embodiments, said task is performed via a touch-screen of an electronic device, and requires said user to drag or move on-screen objects in order to convey said secret data-item.

In some embodiments, said task is performed via a touch-screen of an electronic device, and requires said user to connect on-screen objects with on-screen lines.

In some embodiments, said secret data-item is a password represented by a particular two-dimensional drawing; wherein said task is performed via a touch-screen of an electronic device, and requires said user to draw said particular two-dimensional drawing on said touch-screen.

In some embodiments, the method authenticates, or rejects authentication, of a user that attempts to log-in via an electronic device to an online account managed by a remote server.

In some embodiments, the task requires said user to convey the secret data-item via a touch-screen of an electronic device, without typing said secret data-item on a physical keyboard or on an on-screen keyboard.

In some embodiments, said task comprises: generating an on-screen arrangement of digits and letters; requiring the user to input said secret data-item by drawing on-screen lines among consecutive characters of said secret data-item; determining a speed of task completion of said user drawing lines, and utilizing said speed of task completion as a user-specific characteristic for user authentication.

In some embodiments, said task requires said particular user to perform steps by on-screen dragging operations or on-screen moving operations, that are performed via a touch-screen of an electronic device of said particular user; wherein the step of monitoring user gestures comprises monitoring touch-screen gestures via said touch-screen; wherein the step of extracting comprises extracting said behavioral characteristic from said touch-screen gestures.

In some embodiments, said task requires said particular user to perform steps by on-screen dragging operations or on-screen moving operations, that are performed via a touchpad of an electronic device of said particular user; wherein the step of monitoring user gestures comprises monitoring touch gestures inputted via said touchpad; wherein the step of extracting comprises extracting said behavioral characteristic from said touchpad gestures.

In some embodiments, said task requires said particular user to perform steps by on-screen dragging operations or on-screen moving operations, that are performed via a computer mouse of an electronic device of said particular user; wherein the step of monitoring user gestures comprises monitoring computer mouse gestures; wherein the step of extracting comprises extracting said behavioral characteristic from said computer mouse gestures.

Some embodiments may include a process comprising: (a) storing a representation of a secret data-item of a particular user, wherein said secret data-item is one of: a password, a Personal Identification Number (PIN); (b) generating a user authentication session that requires said particular user to enter said secret data-item by performing a task comprised of spatially moving an entirety of an electronic device, wherein spatial movements of the entirety of the electronic device cause inputting of consecutive characters of said secret-item; (c) during said user authentication session, monitoring spatial properties of the electronic device; and extracting from said spatial properties a behavioral characteristic that characterizes user performance of said task; (d1) determining whether or not said spatial movements correspond to correct entry of said secret data-item; (d2) determining whether or not the behavioral characteristic that was extracted in step (c), matches a previously-stored reference behavioral characteristic that was extracted from previous log-in sessions in which said user had inputted the secret data-item via a set of spatial movements of the entirety of the electronic device; (e) if the determining of step (d1) is negative or the determining of step (d2) is negative, then: generating a notification that user authentication is rejected.

For example, the user holds in his hand(s) the entirety of the portable electronic device (e.g., smartphone, tablet); and spatially moves or tilts or rotates in the air the entirety of the electronic device in a manner that causes task completion and entry of the user's password or PIN. For example, an on-screen representation of a ball is generated; located initially within a circle that has the 26 letters and the 10 digits; the user tilts and moves the smartphone or tablet in mid-air; the device senses the orientation change or the slanting or tilting, via its accelerometer and/or gyroscope and/or compass unit and/or device-orientation sensor; and the on-screen ball moves on the screen in a direction that corresponds to the vertically-lower region of the slanting, imitating a gravitational effect on the on-screen ball; thereby enabling the user to move the ball towards an on-screen character, and to thus indirectly input his password or PIN by making the ball "visit" those on-screen locations by tilting or spatially moving the entirety of the device.

The process performs two checks. The first check focuses on the correctness of the inputted password; namely, did the user indeed cause the ball to visit "f" then "i" then "s" then "h" in order to convey the pre-defined password of "fish". The second check focuses on the behavioral manner in which the device was manipulated or tilted or oriented or spatially engaged in order to effectuate the password entry, and compares such behavioral characteristic(s) to a previously-stored behavioral characteristics that was extracted wen the genuine user (e.g., the account owner) had defined his password or PIN, and/or that was extracted from the most-recent N log-in sessions of the genuine user.

In some embodiments, the task is performed by the user utilizing a portable electronic device; wherein step (c) comprises: monitoring data sensed by an accelerometer of said portable electronic device during task performance by said user; wherein step (d2) comprises: checking whether a behavioral characteristic that was extracted from accelerometer measurements in step (c), match a previously-stored reference behavioral characteristic that was extracted from accelerometer data during previous log-in sessions in which said user had inputted the secret data-item via a set of spatial movements of the entirety of the electronic device.

In some embodiments, the task is performed by the user utilizing a portable electronic device; wherein step (c) comprises: monitoring data sensed by a gyroscope of said portable electronic device during task performance by said user; wherein step (d2) comprises: checking whether a behavioral characteristic that was extracted from gyroscope measurements in step (c), match a previously-stored reference behavioral characteristic that was extracted from gyroscope data during previous log-in sessions in which said user had inputted the secret data-item via a set of spatial movements of the entirety of the electronic device.

In some embodiments, the task is performed by the user utilizing a portable electronic device; wherein step (c) comprises: monitoring data sensed by a spatial orientation sensor of said portable electronic device during task performance by said user; wherein step (d2) comprises: checking whether a behavioral characteristic that was extracted from spatial orientation sensor measurements in step (c), match a previously-stored reference behavioral characteristic that was extracted from spatial orientation sensor data during previous log-in sessions in which said user had inputted the secret data-item via a set of spatial movements of the entirety of the electronic device.

In some embodiments, the task requires said user to convey the secret data-item via spatial movement of the entirety of the electronic device, without typing said secret data-item on a physical keyboard or on an on-screen keyboard.

In some embodiments, the process comprises authenticating said user, or rejecting authentication of said user, based on a cumulative assessment that takes into account (i) the secret data-item that the user knows, and (ii) the specific behavioral way in which the user interacted with the electronic device to input said secret data-item by moving in space or tilting in space the entirety of the electronic device.

In some embodiments, a combined method or process may authenticate the user (or, may reject an authentication attempt of a user), by taking into account three checking results: (i) whether the password that was conveyed now by interacting with the device, matches the reference password; and also, cumulatively, (ii) whether the behavioral characteristic(s) that are extracted from the fresh user interactions during task performance, match the behavioral characteristic(s) that had been extracted from the interactions of the genuine user when he had defined the password; and also, cumulatively, (iii) whether the spatial characteristics of the entirety of the end-user device, that are sensed during the current task performance, match the spatial characteristics of the end-user device when the genuine user had defined the password. For example, user Adam rotates on-screen reels downwardly and slowly while he slants the device 30 degrees to the right; in contrast, user Bob rotates on-screen reels upwardly and rapidly while he slants the device 45 degrees to the left; thereby enabling the system to differentiate between the two users, and to generate a fraud notification when Bob attempts to impersonate as Adam.

In some embodiments, a combined method or process may authenticate the user (or, may reject an authentication attempt of a user), by taking into account three checking results: (I) whether the password that was conveyed now by interacting with the device, matches the reference password;

and also, cumulatively, (II) whether the behavioral characteristic(s) that are extracted from the fresh user interactions during task performance, match the behavioral characteristic(s) that had been extracted from the interactions of the genuine user during his most-recent N log-in sessions; and also, cumulatively, (iii) whether the spatial characteristics of the entirety of the end-user device, that are sensed during the current task performance, match the spatial characteristics of the end-user device during the most-recent N log-in sessions of the genuine user.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein said log-in task comprises a requirement to enter said password or said PIN, by drawing on-screen lines among on-screen representations of characters;
wherein the determining of step (d2) is performed based on at least one of: (I) a speed of on-screen gestures in which said user draws said on-screen lines, (II) a curvature level of on-screen gestures in which said user draws said on-screen lines.

2. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein said log-in task comprises a requirement to enter said password or said PIN, by typing characters on a physical keyboard;
wherein the determining of step (d2) is performed based on a speed in which said user typed, on said physical keyboard, said password or said PIN.

3. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein said log-in task comprises a requirement to enter (I) a username, and (II) said password or said PIN, by typing characters on a physical keyboard;
wherein the determining of step (d2) is performed based on a user-specific behavioral characteristic that indicates whether said user, in previous log-in sessions, (i) used a keyboard shortcut to move between on-screen fields or (ii) used a pointing device to move between on-screen fields.

4. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;

(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein said log-in task comprises a requirement to enter (I) a username, and (II) said password or said PIN, by typing characters on a physical keyboard;
wherein the determining of step (d2) is performed based on a user-specific behavioral characteristic that indicates whether said user, in previous log-in sessions, (i) used an Enter key on a keyboard to submit his credentials, or (ii) used a non-keyboard input unit to click or to tap on an on-screen Submit button to submit his credentials.

5. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein said log-in task comprises a requirement to enter said password or said PIN, by drawing on-screen lines among on-screen representations of characters;
wherein the determining of step (d2) is performed based on: measured acceleration and measured deceleration of user gestures, during entry of said password or said PIN.

6. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the extracting of step (c) comprises:
invoking a Machine Learning (ML) unit that learns and defines a user-specific behavioral profile based on user-gestures that were monitored across multiple previous log-in sessions;
wherein the determining of step (d2) is based on a comparison between (i) monitored user-gestures in a current log-in session, and (ii) the user-specific behavioral profile that was defined by said Machine Learning (ML) unit based on user-gestures that were monitored across multiple previous log-in sessions.

7. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the extracting of step (c) comprises:
invoking a Machine Learning (ML) unit that learns and defines a user-specific behavioral profile based on (I) user-gestures that were monitored across multiple previous log-in sessions, and also (II) user-gestures that were monitored immediately prior to log-in sessions, and also (III) user-gestures that were monitored immediate after log-in sessions;
wherein the determining of step (d2) is based on a comparison between (i) monitored user-gestures in a current log-in session, and (ii) the user-specific behavioral profile that was defined by said Machine Learning (ML) unit based on (I) user-gestures that were monitored across multiple previous log-in sessions, and also (II) user-gestures that were monitored immediately prior to log-in sessions, and also (III) user-gestures that were monitored immediate after log-in sessions.

8. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the method comprises monitoring said user-gestures that are performed by the user on a portable electronic device selected from a group consisting of: a smartphone, a tablet;
wherein the extracting of step (c) comprises:
extracting a user-specific characteristic that corresponds to changes in spatial orientation of an entirety of said portable electronic device during performance of said log-in task by the user;
wherein the determining of step (d2) is based on a comparison between (i) monitored changes in spatial orientation of the entirety of said portable electronic device during performance of said log-in task by the user, and (ii) a user-specific profile that indicates previous changes in spatial orientation of the entirety of said portable electronic device during previous log-in sessions.

9. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the method comprises monitoring said user-gestures that are performed by the user on a portable electronic device selected from a group consisting of: a smartphone, a tablet;
wherein the extracting of step (c) comprises:
extracting a user-specific characteristic that corresponds to time gaps among on-screen drag-and-drop operations that the user performs during said log-in task;
wherein the determining of step (d2) is based on a comparison between (i) monitored time gaps among on-screen drag-and-drop operations that the user performs during said log-in task, and (ii) a user-specific profile that indicates previous time gaps among on-screen drag-and-drop operations that the user performed during previous log-in sessions.

10. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the method comprises monitoring said user-gestures that are performed by the user on a portable electronic device selected from a group consisting of: a smartphone, a tablet,
wherein the extracting of step (c) comprises:
extracting a user-specific characteristic that corresponds to a level of touch-force of touch-based gestures that the user performs via a touch-screen during said log-in task;
wherein the determining of step (d2) is based on a comparison between (i) monitored level of touch-force of touch-based gestures that the user performs during said log-in task, and (ii) a user-specific profile that indicates previous level of touch-force of touch-based gestures that the user performed during previous log-in sessions.

11. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;

(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
wherein the method comprises authenticating said user, or rejecting authentication of said user, based on a cumulative assessment that takes into account (i) the secret data-item that the user knows, and (ii) the specific behavioral way in which the user interacted with the electronic device to input said secret data-item by moving in space or tilting in space the entirety of the electronic device, and (iii) spatial orientation changes of an entirety of the electronic device during performance of said log-in task, and (iv) speed of performing said log-in task by the user.

12. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
monitoring user-gestures during performance of said log-in task; determining that said user-gestures indicate that a current user is non-experienced in performing said log-in task; determining that a legitimate user had performed said log-in task multiple times in previous log-in sessions; and therefore, determining that the current user is not the legitimate user.

13. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
distinguishing among a plurality of human users, who attempt to gain authorized access to a same single electronic device, based cumulatively on: (I) accuracy level in performing the log-in task, and also (II) speed of performing the log-in task, and (III) spatial orientation of an entirety of said electronic device during performance of the log-in task.

14. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;
(e) if the determining of step (d1) is negative or the determining of step (d2) is negative, then: generating a notification that user authentication is rejected;
distinguishing among a plurality of human users, who attempt to gain authorized access to a same single electronic device, based cumulatively on: (I) accuracy level in performing the log-in task, and also (II) speed of performing the log-in task, and (III) curvature level or linearity level of user gestures during performance of the log-in task.

15. A method comprising:
(a) storing a representation of a secret data-item of a particular user, wherein said secret data-item is one of: a password, a Personal Identification Number (PIN);
(b) generating a user authentication session that requires said particular user to enter said secret data-item by performing a task comprised of on-screen operations in which said user drags or moves on-screen objects to input said secret data-item;
(c) during said user authentication session, monitoring user gestures of user performance of said task; and extracting from said user gestures a behavioral characteristic that characterizes user performance of said task;
(d1) determining whether or not said user gestures correspond to correct entry of said secret data-item;
(d2) determining whether or not the behavioral characteristic that was extracted in step (c), matches a previously-stored reference behavioral characteristic that was extracted from past on-screen operations that were previously associated with said particular user during previous log-in sessions;

(e) if the determining of step (d1) is negative or the determining of step (d2) is negative, then: generating a notification that user authentication is rejected;

distinguishing among a plurality of human users, who attempt to gain authorized access to a same single electronic device, based cumulatively on: (I) accuracy level in performing the log-in task, and also (II) speed of performing the log-in task, and (III) touch-force of user gestures during performance of the log-in task.

16. A method comprising:

(a) storing a representation of a secret data-item of a particular user, wherein said secret data-item is one of: a password, a Personal Identification Number (PIN);

(b) generating a user authentication session that requires said particular user to enter said secret data-item by performing a task comprised of on-screen operations in which said user drags or moves on-screen objects to input said secret data-item;

(c) during said user authentication session, monitoring user gestures of user performance of said task; and extracting from said user gestures a behavioral characteristic that characterizes user performance of said task;

(d1) determining whether or not said user gestures correspond to correct entry of said secret data-item;

(d2) determining whether or not the behavioral characteristic that was extracted in step (c), matches a previously-stored reference behavioral characteristic that was extracted from past on-screen operations that were previously associated with said particular user during previous log-in sessions;

(e) if the determining of step (d1) is negative or the determining of step (d2) is negative, then: generating a notification that user authentication is rejected;

distinguishing among a plurality of human users, who attempt to gain authorized access to a same single electronic device, based cumulatively on: (I) accuracy level in performing the log-in task, and also (II) speed of performing the log-in task, and (III) time-gaps among user-gestures during performance of the log-in task.

* * * * *